Patented Dec. 11, 1945

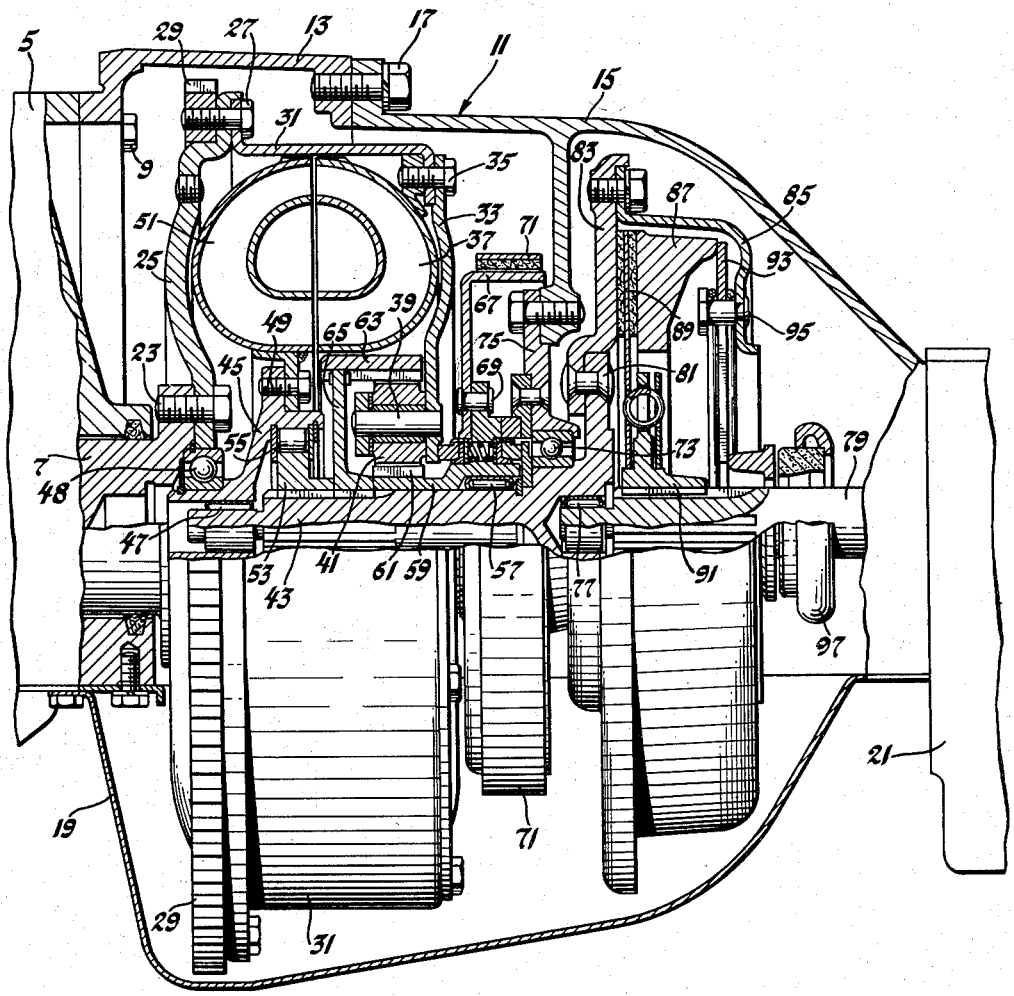

2,390,645

UNITED STATES PATENT OFFICE 2,390,645

OVERDRIVE GEARING

Mark H. Frank, Birmingham, Mich., assignor to General Motors Corporation, Detroit, Mich., a corporation of Delaware Application April 12, 1943, Serial No. 482,669

3 Claims. (Cl. 74—189.5)

This invention may be described as an improvement in power transmission intended for use on motor vehicles.

A novel two-speed assembly is to be located between the engine shaft and the friction clutch of a motor vehicle. The power from the friction clutch is then transmitted to the change speed gear box and the propeller shaft for driving the vehicle.

The invention resembles that of my Patent 2,242,519, dated May 20, 1941, for Overdrive gearing in that it makes use of a two-speed driving unit on the engine side of a conventional change speed gear box and its objects are substantially those enumerated in the specification of my prior patent. The arrangement differs in that in the present invention the friction clutch is located to the rear of, instead of in advance of the two speed unit. It also differs by the inclusion of a fluid coupling operable when the two speed unit is driving the clutch at engine speed whereby great flexibility is provided for the several driving ratios of the conventional gear box.

When the two speed unit is driving through overgear each of the several ratios of the gear box is available with the clutch now rotating at a speed above that of the engine. In this overgear relationship the engine may act as a brake.

Other objects and advantages will be understood from the specification which follows:

In the drawing the single figure is a view in transverse section through the novel two-speed unit and its location between the engine and clutch is shown.

Referring more specifically to the drawing, numeral 5 is used to represent the rear end of the engine casing from which projects the end of the crankshaft 7. To the engine casing is secured as at 9 a housing 11, composed of two parts 13 and 15 secured together by fastening means 17, and a removable closure 19. Housing 11 joins the conventional change speed gear box 21.

To the rear end of engine shaft 7 and within housing 11 is secured by fastening means 23 a disk 25. Fastening means 27 secures to the periphery of the disk a starting ring gear 29 and an annulus 31. To the annulus is secured a disk 33 as at 35. Fastening means 35 also secures to the annulus 31 the impeller 37 of a fluid coupling. Disk 33 carries pins 39 rotatably supporting planet gears 41.

Shaft 43 is concentric with engine shaft 7. A ring 45 is rotatably supported on shaft 43 by roller bearings 47. A bearing 48 is located between disk 25 and the hub of ring 45. Ring 45 is attached as at 49 to the runner 51 of the fluid coupling. Splined to the shaft 43 is a ring 53 and between ring 53 and the ring 45 is an overrunning roller clutch 55.

Rotatably supported on shaft 43 as by bearings 57 is a sleeve 59 formed at one of its ends with a sun gear 61 meshing with planet gears 41. The planets also mesh with a ring gear 63 to which is splined for rotation therewith flange 65 formed with a hub keyed to shaft 43 and located adjacent the end of sleeve 59. A drum 67 is secured by fastening means 69 to the rear radially extended end of sleeve 59. A band 71 surrounds and is adapted to contract upon drum 67 whereby sun gear 61 may be held from rotation. Bearings 73 rotatably carry the rear end of shaft 43 within a casing flange 75.

The extreme rear end of shaft 43 is recessed to receive a pilot bearing 77 of a transmission shaft 79; and it is radially enlarged for connection at 81 to the equivalent 83 of the flywheel of a conventional clutch. The clutch includes a housing 85, pressure plate 87, driven disk 89 with its hub 91, the latter splined to shaft 79. The clutch is engaged by a flat spring 93 anchored to the housing at 95 and the spring is to be released by conventional releasing means identified on the drawing by numeral 97. The transmission shaft extends into the gear box 21 where conventional ratio changing gears preferably with synchronizing expedients will be assembled.

It will be seen that the engine shaft rotates the impeller directly at engine speed and that the planet gears 41 similarly revolve about the axis of shaft 43 at engine speed. When the band 71 is not applied to its drum the impeller drives the runner with the slip characteristic of a fluid coupling and, except for this slip, the shaft 43 is similarly rotated at engine speed. This direct engine speed is transmitted through the clutch and through any one of the gear ratios provided by the gear box. In this way a plurality of driving ratios are provided each originating with a direct drive in the two-speed unit. If, however, the sun gear 61 is held by applying the band 71 to the drum 67, ring gear 63 drives the clutch at double engine speed, the drive through the fluid coupling being rendered ineffective due to the presence of the overrunning clutch 55. A second plurality of driving ratios is thus available by making the several shifts in the gear box.

To select the one or the other of the two driving ratios afforded by the two speed unit, the band 71 is to be free or applied as explained above. Obviously such release and application may be accomplished by any convenient mechanism but to render the change automatic I now propose to use the means illustrated in my Patent 2,242,519. In that patent there is shown means responsive to engine suction to shift the two-speed unit to overgear by holding a sun gear and to shift to direct by releasing the sun gear. In a similar way the band 71 of this application is to be applied for overgear and released for direct. If driving in direct, for example, throttle release will increase the suction and shift the two-speed unit to overgear. In direct the engine will not serve as a brake. However, throttle release will automatically introduce overgear which is positive and effective engine braking can be had by resort to one of the lower speed ratios of the gear box.

In using the expedient of my patented two-speed unit for applying and releasing the band 71 of this assembly it will be obvious that any convenient mechanical connection may be used between the piston rod of the power cylinder and the movable end of the band. Suggestive of one such connection I may refer to Fig. 2 of Kelley 2,176,138, October 17, 1939, Combination fluid turbo clutch and variable speed gearing, where the sun gear is held by a friction band applied to its drum by a fluid motor.

As will be understood the two-speed unit herein described accomplishes the objects sought to be attained by the device of my patent and has the added advantages afforded by the characteristics of the fluid coupling. The relocation of the parts with the friction clutch to the rear of the two-speed unit makes it possible to shift into any of the ratios afforded by the gear box without interfering with the drive through the two-speed unit.

I claim:

1. In a power unit, a source of power, a fluid coupling impeller connected thereto, a runner driven by said impeller, a shaft, an overrunning clutch between said runner and shaft, planet gearing located rearwardly of said runner, connections with said source of power to revolve said planet gearing about the axis of said shaft, means whereby the planet gearing may drive said shaft at double its own speed of rotation, with the overrunning clutch inoperative, a driven shaft, a releasable friction clutch between said shaft and driven shaft, said means comprising a drum, a band adapted to be contracted upon said drum in response to an operative characteristic of said source of power, a sleeve connected to said drum, a sun gear on said sleeve meshing with said planet gearing, a ring gear surrounding and meshing with said planet gearing and a driving connection between said ring gear and said shaft.

2. In a power unit, an engine shaft, a clutch shaft, a driven shaft, a two speed driving unit between and operatively connecting said engine shaft and clutch shaft and a friction clutch operable to connect said clutch shaft and driven shaft, said two speed unit including a fluid coupling and an overrunning clutch for rotating the clutch shaft at engine speed and a planetary gearing comprising engine driven planet gears, a ring gear meshing therewith and having a driving connection to the clutch shaft, a sun gear and means to restrain the sun gear from rotation, said means being responsive to an operational characteristic of said engine, said planetary gearing being operable to drive the clutch shaft at a higher speed than that derived from the drive through the fluid coupling.

3. In a power unit, a source of power, a fluid coupling impeller connected thereto, a runner driven by said impeller, a shaft, an overrunning clutch between said runner and shaft, said impeller being radially spaced from said shaft, planet gearing located within the radial space, connections with said power source to revolve said planet gearing about the axis of said shaft, and means whereby said planet gearing may drive said shaft at double its own speed of revolution, with the overrunning clutch inoperative, said means comprising a drum, a band adapted to be contracted upon said drum, a sleeve connected to said drum, a sun gear on said sleeve meshing with said planet gearing, a ring gear surrounding and meshing with said planet gearing and a driving connection between said ring gear and shaft.

MARK H. FRANK.